United States Patent
Manabe

(10) Patent No.: US 7,333,131 B2
(45) Date of Patent: Feb. 19, 2008

(54) DIGITAL VIDEO APPARATUS CAPABLE OF DETECTING ITS STATUS OF CONNECTION TO PERIPHERAL APPARATUS

(75) Inventor: Katsuhiko Manabe, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 553 days.

(21) Appl. No.: 10/940,335

(22) Filed: Sep. 14, 2004

(65) Prior Publication Data
US 2005/0078219 A1    Apr. 14, 2005

(30) Foreign Application Priority Data
Sep. 18, 2003    (JP)    ............... 2003-325471

(51) Int. Cl.
H04N 17/00    (2006.01)
H04N 5/268    (2006.01)

(52) U.S. Cl. ............. 348/194; 348/575; 348/705

(58) Field of Classification Search ............. 348/194, 348/705, 706, 180, 554, 555, 722, 730, 575, 348/526, 500; 710/15–19; 345/520
See application file for complete search history.

(56) References Cited

U.S. PATENT DOCUMENTS

| | | | |
|---|---|---|---|
| 4,991,023 A * | 2/1991 | Nicols | ............ 348/554 |
| 5,041,905 A | 8/1991 | Hatanaka et al. | |
| 5,298,997 A | 3/1994 | Manabe | |
| 5,513,138 A | 4/1996 | Manabe et al. | |
| 5,712,690 A * | 1/1998 | Kim | ............ 348/570 |
| 5,713,040 A * | 1/1998 | Lee | ............ 345/214 |
| 5,859,666 A | 1/1999 | Manabe | |
| 5,937,176 A * | 8/1999 | Beasley et al. | ............ 710/317 |
| 5,960,155 A | 9/1999 | Fukuoka et al. | |
| 6,112,264 A * | 8/2000 | Beasley et al. | ............ 710/38 |
| 6,212,331 B1 | 4/2001 | Fukuoka et al. | |
| 6,334,027 B1 | 12/2001 | Fukuoka et al. | |
| 6,427,049 B2 | 7/2002 | Fukuoka et al. | |
| 6,448,963 B1 * | 9/2002 | Han | ............ 345/213 |
| 6,449,017 B1 * | 9/2002 | Chen | ............ 348/539 |
| 2004/0104715 A1 | 6/2004 | Manabe et al. | |
| 2004/0116162 A1 | 6/2004 | Matsushima et al. | |

FOREIGN PATENT DOCUMENTS

JP    6-38150    2/1994

* cited by examiner

*Primary Examiner*—Victor R. Kostak
(74) *Attorney, Agent, or Firm*—Cooper & Dunham LLP

(57) ABSTRACT

A method and apparatus of detecting a connection status of a digital video apparatus to a peripheral apparatus includes a digital video encoder configured to receive a digital video signal, and convert and output the digital video signal into an analog video signal, and a determination circuit configured to detect a voltage level of a horizontal synchronization signal of the analog video signal in a vertical blanking time determined by vertical synchronization signals, and determine whether the digital video apparatus is connected to a peripheral apparatus based on a detection result of the voltage of the horizontal synchronization signal of the analog video signal.

20 Claims, 3 Drawing Sheets

DIGITAL VIDEO APPARATUS CAPABLE OF DETECTING ITS STATUS OF CONNECTION TO PERIPHERAL APPARATUS

BACKGROUND

1. Field

This patent application relates to a digital video apparatus, and more particularly to a digital video apparatus which stably detects its status of connection to a peripheral apparatus.

2. Description of Related Art

A conventional digital video apparatus includes a digital video encoder and a digital to analog converter (DAC).

The digital video encoder generates three digital television signals of a luminance signal Y, a chrominance signal C, and a composite signal YC from digital primary color signals of R (red), G (green), and B (blue), or digital signals of Y (luminance signal), Cb (blue color difference signal), and Cr (red color difference signal).

The DAC converts the digital luminance signal Y, the digital chrominance signal C, and the digital composite signal YC to an analog luminance signal Y, an analog chrominance signal C, and an analog composite signal YC, and outputs these analog video signals.

The digital video encoder converts a digital video signal taken by a digital video apparatus such as a digital camera to an analog video signal. The analog video signal is transmitted to and played on a peripheral apparatus such as a monitor television.

The digital video apparatus and the peripheral apparatus such as a monitor television, which is detachable from the digital video apparatus, communicate signals such as a video signal with each other.

The digital video apparatus including the digital video encoder detects a connection status of the peripheral apparatus such as a monitor television to the digital video apparatus. The above-mentioned digital video apparatus can save its power consumption by controlling outputs of the digital video encoder or the like based on the detected connection status. Power saving is a critical matter particularly for a battery-powered portable type digital video apparatus.

An exemplary conventional detection circuit which detects a connection status of a peripheral apparatus such as a monitor television to the digital video apparatus is illustrated in FIG. 1.

As illustrated in FIG. 1, the conventional detection circuit includes a resistor Rd, a resistor Re, a resistor Rt, a connector Tt, a comparator 1, a resistor Rs, a power source Vs, a coupling capacitor Ct, and an amplifier At.

In the conventional detection circuit, the comparator 1 compares a voltage at a connection point between the resistor Rd and the resistor Re (e.g, Re=2×Rd), and a voltage at a connection point between the resistor Rt and the connector Tt to detect a connection status at the connector Tt. The comparator 1 outputs a high level signal when the peripheral apparatus such as a monitor television is connected to the connector Tt.

The conventional detection circuit of the digital video apparatus has a video signal output terminal, and determines whether the peripheral apparatus such as a monitor television is connected to the video signal output terminal of the digital video apparatus.

Specifically, a resistor is provided to a terminal of the digital video apparatus, and pulled up to a power source. The resistor has an ohmic value which is significantly larger than that of a resistor provided to the monitor television and connected to a ground. For example, the resistor provided to the terminal of the digital video apparatus has about one mega ohms, and the resistor of the monitor television has 75 ohms.

When the monitor television is connected to the terminal of the digital video apparatus, a voltage, determined by a voltage dividing ratio of the resistor of the monitor television having 75 ohms and the resistor at the terminal of the digital video apparatus having about one mega ohms, is generated at the terminal of the digital video apparatus.

The conventional detection circuit detects a voltage change at the terminal of the digital video apparatus, and can detect a connection status of the peripheral apparatus such as a monitor television to the digital video apparatus.

The above-mentioned configuration of the conventional detection circuit, which detects a voltage change determined by a voltage dividing ratio of resistors, can stably detect the connection status of the peripheral apparatus such as a monitor television to the digital video apparatus when the digital video apparatus does not output a video signal.

However, when the digital video apparatus outputs a video signal, the above-mentioned configuration of the conventional detection circuit cannot stably detect the connection status of the peripheral apparatus such as a monitor television to the digital video apparatus due to a voltage level of the video signal.

Furthermore, the above-mentioned configuration of the conventional detection circuit has a drawback that it needs external resistors, resulting in an increase of numbers of components.

SUMMARY

This patent application describes a novel digital video apparatus. In one example, this novel digital video apparatus includes a digital video encoder, and a determination circuit. The digital video encoder receives a digital video signal, and converts and outputs the digital video signal into an analog video signal. The determination circuit detects a voltage level of a horizontal synchronization signal of the analog video signal in a vertical blanking time determined by vertical synchronization signals, and determines whether the digital video apparatus is connected to a peripheral apparatus based on a detection result of the voltage of the horizontal synchronization signal of the analog video signal.

In the above-mentioned digital video apparatus, the determination circuit determines that the digital video apparatus is not connected to the peripheral apparatus if it is detected that the voltage of the horizontal synchronization signal of the analog video signal is zero.

In the above-mentioned digital video apparatus, the determination circuit determines that the digital video apparatus is connected to the peripheral apparatus if it is detected that the voltage of the horizontal synchronization signal of the analog video signal is larger than a predetermined voltage.

In the above-mentioned digital video apparatus, the predetermined voltage is within a range of from approximately 150 mV to approximately 250 mV.

In the above-mentioned digital video apparatus, the digital video apparatus controls a power-on or power-off of the digital video encoder based on a detection result of the determination circuit.

This patent application describes a novel method of detecting a connection status of a digital video apparatus to a peripheral apparatus. In one example, this novel method includes the steps of receiving, converting, detecting, and determining. The receiving step receives a digital video signal. The converting step converts the digital video signal into an analog video signal. The detecting step detects a voltage level of a horizontal synchronization signal of an analog video in a vertical blanking time determined by vertical synchronization signals. The determining step determines whether the digital video apparatus is connected to the peripheral apparatus based on a detection result of the voltage of the horizontal synchronization signal of the analog video signal.

The above-mentioned determining step determines that the digital video apparatus is not connected to the peripheral apparatus if it is detected that the voltage of the horizontal synchronization signal of the analog video signal is zero.

The above-mentioned determining step determines that the digital video apparatus is connected to the peripheral apparatus if it is detected that the voltage of the horizontal synchronization signal of the analog video signal is larger than a predetermined voltage.

The above-mentioned predetermined voltage is within a range of from approximately 150 mV to approximately 250 mV.

The above-mentioned digital video apparatus controls supply of power for the receiving and converting steps based on a detection result of the determination circuit.

This patent application describes another novel digital video apparatus. In one example, this novel digital video apparatus includes an interface, a first signal generation circuit, a modulation circuit, a first adder circuit, a second adder circuit, a second signal generation circuit, a synchronization signal insertion circuit, a digital to analog converter, and a determination circuit. The interface receives and transmits a digital signal. The first signal generation circuit generates a luminance signal and a color difference signal. The modulation circuit modulates a color sub-carrier using the color difference signal. The first adder circuit inserts the color sub-carrier to a color burst position as a color burst signal and generates a digital chrominance signal. The second adder circuit adds the digital luminance signal and the digital chrominance signal to generate a digital composite signal. The second signal generation circuit generates a composite synchronization signal. The synchronization signal insertion circuit inserts the composite synchronization signal in the digital composite signal. The digital to analog converter receives a digital video signal from the synchronization signal insertion circuit and outputs an analog video signal. The determination circuit detects a voltage of a horizontal synchronization signal of the analog video signal in a vertical blanking time determined by vertical synchronization signals, and determines whether the digital video apparatus is connected to a peripheral apparatus based on a detection result of the voltage of the horizontal synchronization signal of the analog video signal.

BRIEF DESCRIPTION OF THE DRAWINGS

The features of the present application and many of the attendant advantages thereof can be more readily understood from the following detailed description with reference to the accompanying drawings, wherein.

DETAILED DESCRIPTION OF PREFERRED EMBODIMENTS

Figure 1:
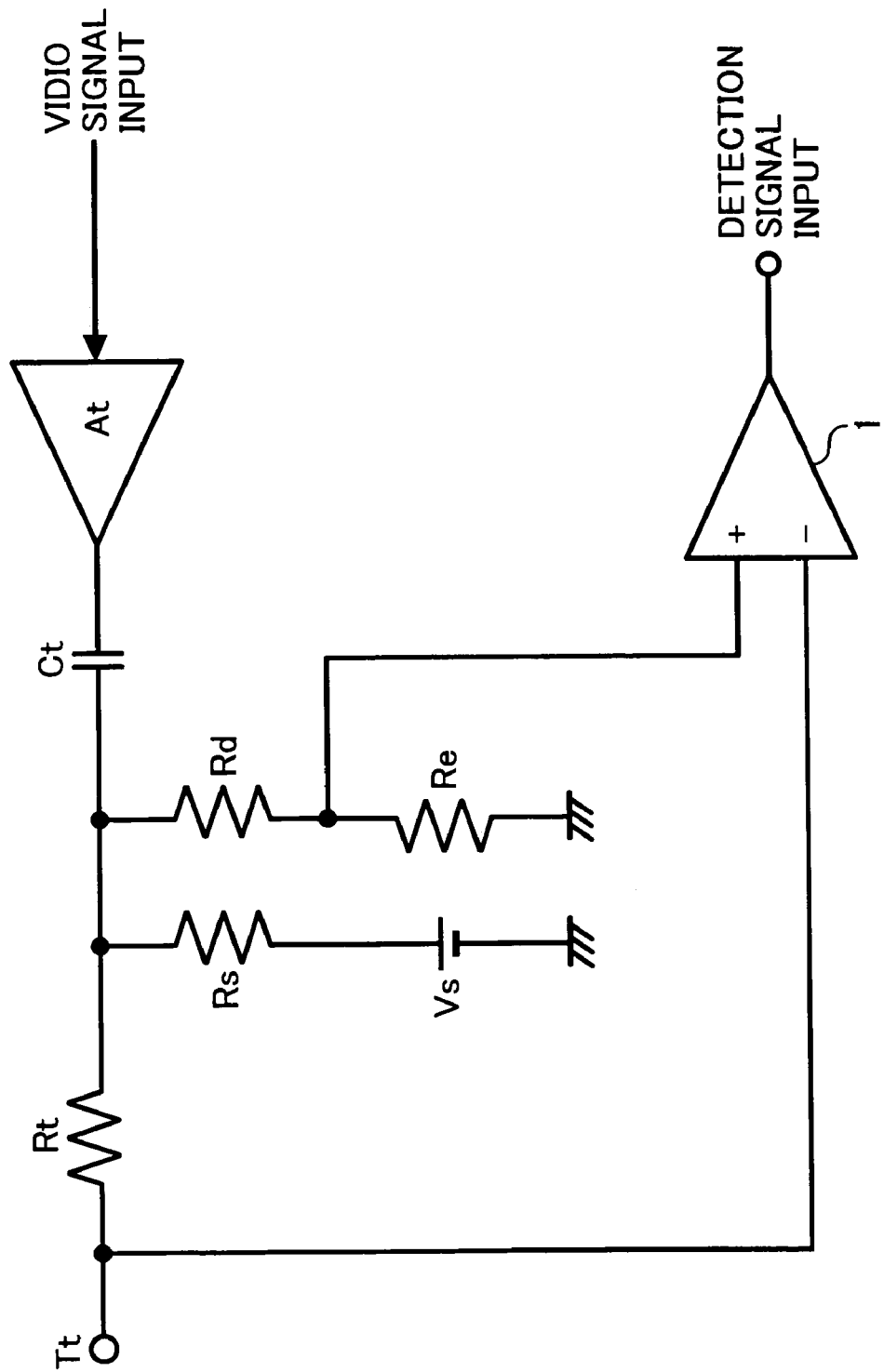
FIG. 1 is an exemplary circuit diagram of a conventional detection circuit configured to detect a connection status of a peripheral apparatus to a digital video apparatus.

In describing preferred embodiments illustrated in the drawings, specific terminology is employed for the sake of clarity. However, the disclosure of the present patent specification is not intended to be limited to the specific terminology so selected and it is to be understood that each specific element includes all technical equivalents that operate in a similar manner.

Figure 2:
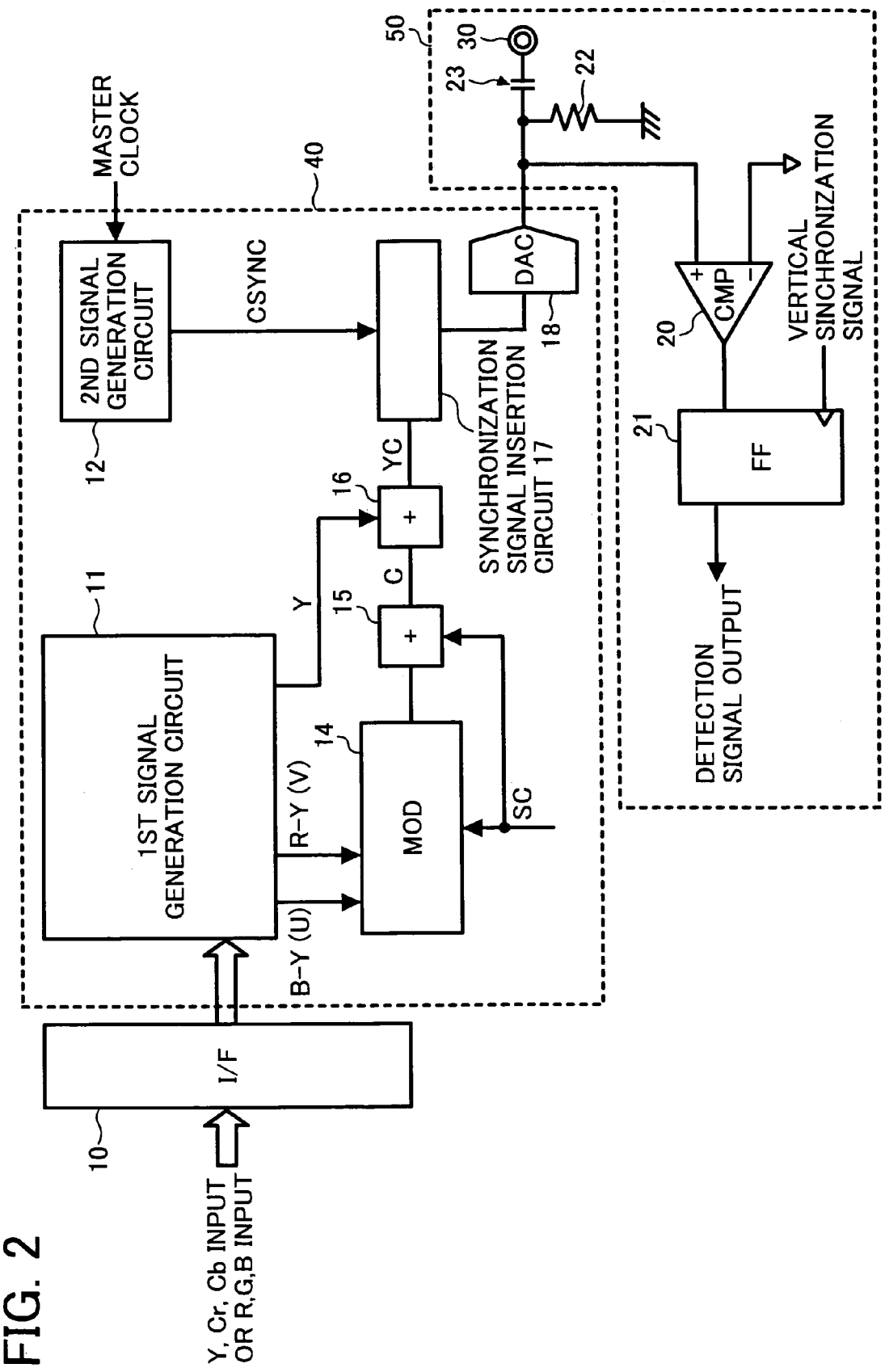
FIG. 2 is an exemplary block diagram of a digital video apparatus according to an exemplary embodiment of this patent application.

Referring now to the drawings, wherein like reference numerals designate identical or corresponding parts throughout the several views, and more particularly to FIG. 2 thereof, an exemplary block diagram of a digital video apparatus according to an exemplary embodiment of this patent application is described.

The digital video apparatus includes an interface circuit 10, a digital encoder portion 40, and a determination circuit 50.

The digital encoder portion includes a first signal generation circuit 11, a second signal generation circuit 12, a modulation circuit 14, a first adder circuit 15, a second adder circuit 16, a synchronization signal insertion circuit 17, and a digital to analog converter (DAC) 18.

The determination circuit includes a comparator 20, a flip-flop circuit 21, a terminal resistor 22, a coupling capacitor 23, and a jack 30.

Digital primary color signals of R (red), G (green), and B (blue), and digital signals of Y (luminance signal), Cb (blue color difference signal), and Cr (red color difference signal) are input through the interface circuit 10. These signals are transmitted to the first signal generation circuit 11 which generates a luminance signal and color difference signals.

The first signal generation circuit 11 generates a digital luminance signal Y, a digital R-Y signal (i.e., V signal), and a digital B-Y signal (i.e., U signal) from the three digital primary color signals of R, G, and B, or digital signals of Y, Cb, and Cr, which are input to the digital video apparatus.

The second signal generation circuit 12 generates a plurality of synchronization signals including horizontal and vertical synchronization signals, and generates a composite synchronization signal CSYNC based on the plurality of synchronization signals, using a master clock signal input from an external device (not shown). The synchronization signal insertion circuit 17 inserts the composite synchronization signal CSYNC in a composite signal (discussed below).

The first signal generation circuit 11 outputs the B-Y signal (i.e., U signal) and the R-Y signal (i.e., V signal) to the modulation circuit 14. The modulation circuit 14 modulates a color sub-carrier SC based on the B-Y signal (i.e., U signal) and the R-Y signal (i.e., V signal), and outputs a modulated signal. A frequency fSC for the color sub-carrier SC is about 3.58 MHz for NTSC (National Television System Committee), and about 4.43 MHz for PAL (Phase Alternating Line).

The modulated signal output from the modulation circuit 14 is transmitted to the first adder circuit 15. The first adder circuit 15 inserts the color sub-carrier SC in the modulated signal at a color burst position as a color burst signal and generates a digital chrominance signal C.

The second adder circuit 16 adds the digital luminance signal Y and the digital chrominance signal C to generate a digital composite signal YC.

The second signal generation circuit 12 outputs the composite synchronization signal CSYNC to the synchronization signal insertion circuit 17.

In the synchronization signal insertion circuit 17, a synchronization signal is inserted in a signal such as the digital composite signal output from the second adder circuit 16. After the insertion, the digital signal is converted to an analog signal by the DAC 18, and is output as an analog video signal. The jack 30 receives the analog video signal through the terminal resistor 22 and the coupling capacitor 23.

The electrically driven DAC 18 is between the synchronization signal insertion circuit 17 and the coupling capacitor 23, and outputs an analog video signal for monitoring.

The video signal output from the DAC 18 is transmitted to a positive (+) terminal of the comparator 20 which is used as a determination circuit to detect a connection status of the peripheral apparatus such as monitor television to the jack 30. A negative (−) terminal of the comparator 20 receives a determination voltage level of 200 mV, for example. The determination voltage level is switchable between 200 mV and 150 mV by a resistor, for example.

Figure 3:
FIG. 3 is an exemplary waveform of a composite signal according to an exemplary embodiment of this patent application.

The flip-flop circuit 21 receives an output from the comparator 20, and registers the output from the comparator 20 according to a signal supplied through a clock-input terminal of the flip-flop circuit 21 during a vertical blanking time (i.e., vertical synchronization signal) which is illustrated in FIG. 3.

FIG. 3 is an exemplary waveform of a composite signal according to an exemplary embodiment of this patent application. The composite signal includes horizontal synchronization signals, vertical synchronization signals, and luminance signals.

A connection status of the peripheral apparatus such as a monitor television to the jack 30 is determined during low level periods of the horizontal synchronization signals in the vertical blanking time determined by the vertical synchronization signals. The vertical synchronization signals are transmitted from the second signal generation circuit 12.

The electrically driven DAC 18 outputs a composite signal including horizontal synchronization signals as illustrated in FIG. 3.

When the peripheral apparatus such as a monitor television is not connected to the jack 30, a low level of the horizontal synchronization signals in the vertical blanking time becomes 0 mV.

Then the comparator 20 compares the low level of 0 mV with the determination voltage level of 200 mV, for example, and outputs a low level signal to the flip-flop circuit 21.

When the low level signal is transmitted to the flip-flop circuit 21 in the vertical blanking time, it is determined that the peripheral apparatus such as a monitor television is not connected to the jack 30.

When the flip-flop circuit 21 outputs a signal indicating that the peripheral apparatus such as a monitor television is not connected to the jack 30, an external controller (not shown) having a CPU performs a sleep control to the first signal generation circuit 11, the DAC 18, the second signal generation circuit 12 or the like to save power consumption of the digital video apparatus.

On the other hand, when the peripheral apparatus such as monitor television is connected to the jack 30, a low level of the horizontal synchronization signal in the vertical blanking time becomes about 300 mV or more, for example.

Then the comparator 20 compares the low level of 300 mV with the determination voltage level of 200 mV, for example, and outputs a high level signal to the flip-flop circuit 21.

When the high level signal is transmitted to the flip-flop circuit 21 in the vertical blanking time, it is determined that the peripheral apparatus such as a monitor television is connected to the jack 30.

The above-mentioned external controller (not shown) having a CPU does not perform a sleep control when the peripheral apparatus such as a monitor television is connected to the jack 30, but normal operations of the digital video apparatus are performed.

A determination timing of the above-mentioned connection status may be configured to be switchable between a field basis and a frame basis by storing setting conditions to a register or the like.

As described above, when the connection status of the peripheral apparatus such as a monitor television is detected by an output from the comparator 20 in the vertical blanking time, a power on/off control of the digital video apparatus can be controlled by the digital video apparatus or an external controller (not shown) having a CPU, for example.

To realize a power on/off control by the external controller (not shown), a digital video apparatus may be configured to transmit an interruption signal from the flip-flop circuit 21 to the external controller (not shown) when a connection status of the peripheral apparatus such as monitor television changes.

Numerous additional modifications and variations are possible in light of the above teachings. It is therefore to be understood that within the scope of the appended claims, the disclosure of the present patent specification may be practiced otherwise than as specifically described herein. For example, elements and/or features of different illustrative embodiments may be combined with each other and/or substitutional for each other within the scope of this disclosure and appended claims.

This application claims priority from Japanese patent application No. 2003-325471 filed on Sep. 18, 2003 in the Japan Patent Office, the entire contents of which are hereby incorporated by reference herein.

What is claimed is:

1. A digital video apparatus, comprising:
a digital video encoder configured to receive a digital video signal, and convert and output the digital video signal into an analog video signal; and
a determination circuit configured to detect a voltage of a horizontal synchronization signal of the analog video signal in a vertical blanking time determined by vertical synchronization signals, and determine whether the digital video apparatus is connected to a peripheral apparatus based on a detection result of the voltage of the horizontal synchronization signal of the analog video signal.

2. The digital video apparatus according to claim 1, wherein the determination circuit determines that the digital video apparatus is not connected to the peripheral apparatus when detecting that the voltage of the horizontal synchronization signal of the analog video signal is zero.

3. The digital video apparatus according to claim 1, wherein the determination circuit determines that the digital video apparatus is connected to the peripheral apparatus when detecting that the voltage of the horizontal synchronization signal of the analog video signal is larger than a predetermined voltage.

4. The digital video apparatus according to claim 3, wherein the predetermined voltage is within a range of from approximately 150 mV to approximately 250 mV.

5. The digital video apparatus according to claim 1, wherein the digital video apparatus controls a power-on or power-off of the digital video encoder based on a detection result of the determination circuit.

6. A digital video apparatus, comprising:
encoding means for receiving a digital video signal, and converting and outputting the digital video signal into an analog video signal;
determining means for detecting a voltage of a horizontal synchronization signal of the analog video signal in a vertical blanking time determined by vertical synchronization signals, and determining whether the digital video apparatus is connected to a peripheral apparatus based on a detection result of the voltage of the horizontal synchronization signal of the analog video signal.

7. The digital video apparatus according to claim 6, wherein the determining means determining that the digital video apparatus is not connected to the peripheral apparatus when detecting that the voltage of the horizontal synchronization signal of the analog video signal is zero.

8. The digital video apparatus according to claim 6, wherein the determining means determines that the digital video apparatus is connected to the peripheral apparatus when detecting that the voltage of the horizontal synchronization signal of the analog video signal is larger than a predetermined voltage.

9. The digital video apparatus according to claim 8, wherein the predetermined voltage is within a range of from approximately 150 mV to approximately 250 mV.

10. The digital video apparatus according to claim 6, wherein the digital video apparatus controls a power-on or power-off of the encoding means based on a detection result of the determining means.

11. A method of detecting a connection status of a digital video apparatus to a peripheral apparatus, comprising the steps of:
receiving a digital video signal;
converting the digital video signal into an analog video signal;
detecting a voltage of a horizontal synchronization signal of the analog video signal in a vertical blanking time determined by vertical synchronization signals; and
determining whether the digital video apparatus is connected to the peripheral apparatus based on a detection result of the voltage of the horizontal synchronization signal of the analog video signal.

12. The method of detecting the connection status of the digital video apparatus to the peripheral apparatus according to claim 11, wherein the determining step determines that the digital video apparatus is not connected to the peripheral apparatus when detecting that the voltage of the horizontal synchronization signal of the analog video signal is zero.

13. The method of detecting the connection status of the digital video apparatus to the peripheral apparatus according to claim 11, wherein the determining step determines that the digital video apparatus is connected to the peripheral apparatus when detecting that the voltage of the horizontal synchronization signal of the analog video signal is larger than a predetermined voltage.

14. The method of detecting the connection status of the digital video apparatus to the peripheral apparatus according to claim 13, wherein the predetermined voltage is within a range of from approximately 150 mV to approximately 250 mV.

15. The method of detecting the connection status of the digital video apparatus to the peripheral apparatus according to claim 11, wherein the digital video apparatus energizes the receiving and converting steps based on a detection result of the determination circuit.

16. A digital video apparatus, comprising:
an interface configured to receive and transmit a digital signal;
a first signal generation circuit configured to generate a luminance signal and a color difference signal;
a modulation circuit configured to modulate a color sub-carrier using the color difference signal;
a first adder circuit configured to insert the color sub-carrier to a color burst position as a color burst signal and generate a digital chrominance signal;
a second adder circuit configured to add the digital luminance signal and the digital chrominance signal to generate a digital composite signal;
a second signal generation circuit configured to generate a composite synchronization signal;
a synchronization signal insertion circuit configured to insert the composite synchronization signal to the digital composite signal;
a digital to analog converter configured to receive a digital video signal from the synchronization signal insertion circuit and output an analog video signal; and
a determination circuit configured to detect a voltage of a horizontal synchronization signal of the analog video signal in a vertical blanking time determined by vertical synchronization signals, and determine whether the digital video apparatus is connected to a peripheral apparatus based on a detection result of the voltage of the horizontal synchronization signal of the analog video signal.

17. The digital video apparatus according to claim 16, wherein the determination circuit determines that the digital video apparatus is not connected to the peripheral apparatus when detecting that the voltage of the horizontal synchronization signal of the analog video signal is zero.

18. The digital video apparatus according to claim 16, wherein the digital video apparatus controls a power-on or power-off of the digital video encoder based on a detection result of the determination circuit.

19. The digital video apparatus according to claim 16, wherein the digital video encoder comprises a synchronization signals generation circuit configured to generate horizontal and vertical synchronization signals, and a signal insertion circuit configured to insert said horizontal and vertical synchronization signals in said analog video signal.

20. The digital video apparatus according to claim 1, wherein the peripheral apparatus is a video monitor.

* * * * *